United States Patent [19]
Geesen

[11] 4,231,840
[45] Nov. 4, 1980

[54] METHOD OF CONCENTRATING AN AQUEOUS SOLUTION BY MULTIPLE EFFECT EVAPORATING

[75] Inventor: Donald H. Geesen, Wilcox, Canada

[73] Assignee: PPG Industries Canada Ltd., Regina, Canada

[21] Appl. No.: 8,358

[22] Filed: Feb. 1, 1979

[51] Int. Cl.² .............................................. B01D 1/26
[52] U.S. Cl. ............................... 159/47 R; 159/20 R; 159/17 R; 23/302 R; 159/45
[58] Field of Search .................. 159/20 R, 20 CS, 47, 159/17, 45; 23/302, 303

[56] References Cited
U.S. PATENT DOCUMENTS

| | | | |
|---|---|---|---|
| 1,216,187 | 2/1917 | Trump | 159/17 R |
| 2,941,590 | 6/1960 | Rosenblad | 159/20 R |
| 3,365,278 | 1/1968 | Kelly et al. | 159/20 R |
| 3,433,603 | 3/1969 | Jeffery | 159/20 R |
| 3,704,101 | 11/1972 | Kelly | 159/20 R |

Primary Examiner—Norman Yudkoff
Attorney, Agent, or Firm—Walter M. Benjamin

[57] ABSTRACT

Disclosed is an improved method of concentrating an aqueous solution containing a first salt and a second salt, the solubility of the first salt increasing more with increasing temperature than the solubility of the second salt, by multiple effect evaporation, wherein the multiple effect evaporators are backward fed, wherein the first evaporator effect is the hottest, wherein second salt is precipitated during evaporation, wherein the concentrated mother liquor is forwarded to a zone operated at atmospheric pressure, and wherein mother liquor effluent from the zone operated at atmospheric pressure is forwarded to a zone wherein the first salt is recovered. In the improved method the first evaporator effect is operated at super atmospheric pressure, one evaporator effect is operated at atmospheric pressure and at least one evaporator effect is cooler than the evaporator effect operated at atmospheric pressure, one portion of the overflow from the evaporator effect cooler than the evaporator effect operated at atmospheric pressure is fed to the first evaporator effect and the other portion is fed to the evaporator effect operated at atmospheric pressure and the overflow from the first evaporator effect is fed to the evaporator effect operated at atmospheric pressure.

3 Claims, 1 Drawing Figure

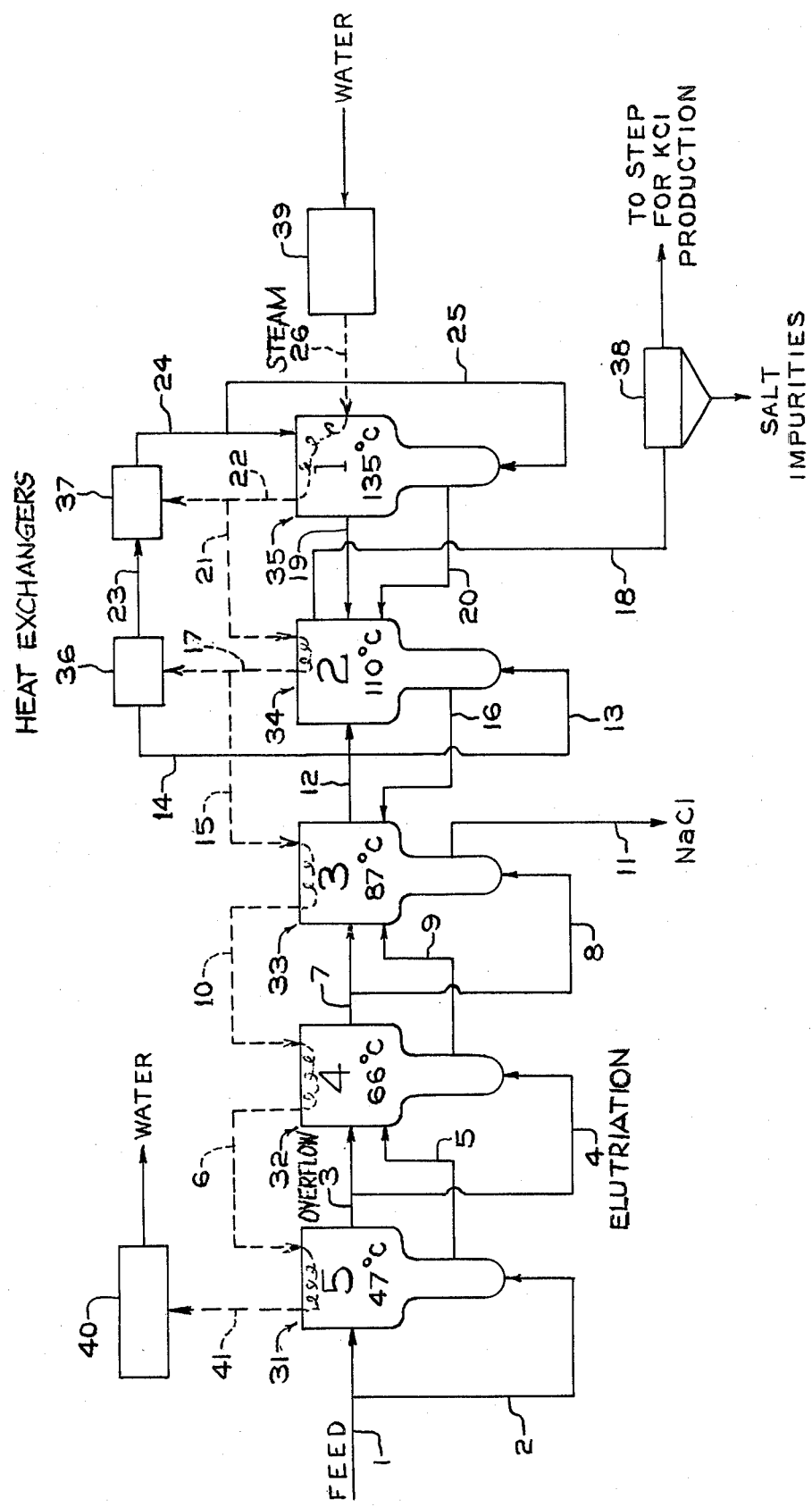

METHOD OF CONCENTRATING AN AQUEOUS SOLUTION BY MULTIPLE EFFECT EVAPORATING

BACKGROUND OF THE INVENTION

This invention relates to an improved method of concentrating by multiple effect evaporation solutions containing mixtures of salts and particularly this invention relates to concentrating by multiple effect evaporation solutions containing a first and a second salt, where the solubility of the first salt increases more with increasing temperatures than the solubility of the second salt. Even more particularly, this invention relates to an improved method whereby the solution concentrated contains principally potassium chloride, sodium chloride and a minor amount of salt impurities such as chlorides and sulfates of magnesium and calcium.

Salts having a solubility that increases with increasing temperatures within a given temperature range, hereinafter called first salts, and salts having a solubility that remains relatively unchanged or decreases with increasing temperatures within the same temperature range, hereinafter called second salts, are frequently encountered as mixtures in naturally occuring ores. In recovering such salts, the ore is dissolved in a suitable aqueous solvent forming a solution from which the salts can be easily separated. Admixtures of these salts in solution can also arise as a result of industrial chemical production, e.g., as a result of the electrolysis of electrolytes.

These salts can be separated from the solution by concentrating the solution by evaporation to produce a solution in which the first and second salt are concentrated to their "invariant composition". By "invariant composition" is meant a composition in which a solution at a given temperature is saturated with respect to two or more salts. This solution is forwarded to a recovery zone where the first salt is recovered, e.g., by cooling the solution so that the first salt will selectively crystallize out of solution and precipitate. The temperature range at which the water removal step and cooling step takes place is a range in which the first salt and second salt maintain their solubility characteristics. If the second salt is initially in high enough concentration, it will be precipitated and can be recovered during the initial evaporation step. Otherwise, subsequent evaporation after recovering the first salt can yield production of the second salt. Thus, alternate evaporation and cooling can substantially deplete the solution of the first and second salt.

Potassium chloride (first salt) and sodium chloride (second salt) are recovered commercially from naturally occurring ores comprising principally potassium chloride and sodium chloride and to a lesser extent a minor amount of salt impurities such as chlorides and sulfates of magnesium and calcium, e.g., less than 6 percent of salt impurities. In this commercially practical process, water is removed from the solution by evaporation until the solution approaches or reaches its invariant composition. Large amounts of sodium chloride and some salt impurities are precipitated and sodium chloride removed during the evaporation step. The solution is then purged of impurities precipitated during evaporation and cooled to crystallize potassium chloride while other salts and impurities remain in solution.

The invariant composition of potassium chloride-sodium chloride solutions is affected by other salts in the solution. For example, solutions of many naturally occurring potassium chloride-sodium chloride containing ores also comprise chlorides, carbonates, sulfates and the like of anions other than sodium and potassium, as hereinbefore mentioned. The presence of some of these other salts will lower the salt concentration of the invariant composition from the concentration found for a mixture of only sodium chloride and potassium chloride. For example, the presence of a few parts magnesium chloride per hundred parts water will lower the invariant composition by a few parts each of sodium chloride and potassium chloride.

Evaporation of potassium chloride-sodium chloride solutions are carried out with great expediency by backward fed multiple effect evaporation to achieve high product recovery and great steam economy. That is, mother liquor effluent overflow from cooler evaporator effects is forwarded to hotter evaporator effects. To obtain a satisfactory working temperature difference between the first (hottest) evaporator effect and the last (coolest) evaporator effect, the first evaporator effect is operated under super atmospheric pressure and the last evaporator effect is operated under vacuum. As the solution passes through each evaporator effect, water is removed in the form of vapor and the solution becomes concentrated with respect to potassium chloride while precipitating sodium chloride which settles into and is removed from an elutriation leg in communication with the bottom of each evaporator. Sodium chloride will precipitate until the solution reaches its invariant composition for the temperature at which each evaporator effect is operated. Impurities which have solubility characteristics of second salts may be precipitated as well during the process but are fluidized by an elutriating liquid so that sodium chloride can be recovered relatively pure.

Since the feed solution is relatively cool, the evaporator effects are heated by steam in a direction opposite to that of the solution, i.e., backward feed. The first evaporator effect is heated by introducing steam from an external source, such as a boiler, and the second evaporator effect is heated with vapors from the first evaporator effect and so on, progressively to the last evaporator effect whose vapor is utilized for whatever requirement low value steam can serve or is condensed and cooled for use as a coolant.

Mother liquor effluent overflow from the first evaporator effect is transferred to a solids settling zone or thickener. In this zone, fine particles of salt impurities which were precipitated in each evaporator effect and carried forward with mother liquor overflow are allowed to settle. Typically, the settling zone is operated at atmospheric pressure and under quiescent conditions in order for the settling to take place to facilitate removal of the solids from the mother liquor. Clarified mother liquor therefrom can then be forwarded to the step in which potassium chloride is recovered. So, it is a desideratum that mother liquor from the evaporation is not at super atmospheric pressure, the reduction of which to atmospheric pressure causes flashing. Flashing results in agitation of the mother liquor in the settling zone, thereby making it difficult for the settling of the fine particles to take place. Also, flashing produces the undesirable result of cooling the mother liquor which is as hereinbefore described at its invariant composition, the result of which is precipitation and loss of potassium chloride along with fine particles of impurities already in the solution.

SUMMARY OF THE INVENTION

It has been found that in the separation of a mixture of a first salt and a second salt from their mother liquor by concentrating the solution with respect to the first salt by backward fed multiple effect evaporation while precipitating the second salt, mother liquor from the evaporators can be forwarded to the settling zone at atmospheric pressure even though the first evaporator effect is operated at super atmospheric pressure. This is accomplished by operating one evaporator effect at atmospheric pressure, feeding to the first evaporator effect a portion of the overflow from an evaporator effect cooler than the evaporator effect operated at atmospheric pressure, feeding the other portion to the evaporator effect operated at atmospheric pressure, feeding the overflow from the first evaporator effect to the evaporator effect operated at atmospheric pressure and forwarding to the settling zone the overflow from the evaporator effect operated at atmospheric pressure.

This invention has the benefit of evaporating the solution at super atmospheric pressure without losing the steam value lost through flashing, i.e., because when flashing is allowed, vapor flashed from first evaporator effect mother liquor can only be used as a source of heat for an effect no hotter than the third evaporator effect, losing one effect of steam economy. Still, by the novel method mother liquor is removed from the evaporators at atmospheric pressure. Hence, greater salt recovery is expediently facilitated. Steam from the first evaporator effect and steam from the evaporator effect operated at atmospheric pressure can be utilized in heating the solution fed to the first evaporator effect.

In one embodiment of the present invention, the second evaporator effect of a five effect evaporation system is operated at atmospheric pressure. One portion of the overflow from the third evaporator effect is fed to the first evaporator effect, while the other portion is fed to the second evaporator effect. The overflow from the first evaporator effect is fed to the second evaporator effect and the overflow from the second evaporator effect is forwarded to the settling zone.

BRIEF DESCRIPTION OF THE DRAWING

Further benefits and advantages will become apparent from the detailed description made below with reference to the drawing in which a five effect evaporation system is shown wherein the second evaporator effect is operated at atmospheric pressure and the first evaporator effect operated at super-atmospheric pressure.

DETAILED DESCRIPTION OF THE INVENTION

According to the present invention, the first evaporator effect of multiple effect evaporators is operated at super atmospheric pressure and one evaporator effect is operated at atmospheric pressure to allow effluent from the evaporators to be forwarded to a settling zone at atmospheric pressure while the solution is being concentrated by evaporation at a temperature associated with super-atmospheric pressure. Operation of evaporators in this manner at super-atmospheric pressure enhances the separation of a mixture of a first salt and a second salt from their aqueous solution by concentrating the solution with respect to the first salt at progressively higher temperatures while selectively precipitating the second salt. The resulting solution is subsequently cooled to selectively precipitate the first salt.

First salts treated by the method of the present invention are salts which have a solubility that increases with increasing temperatures within a given temperature range. Accordingly, first salts include potassium chloride, magnesium chloride, sodium carbonate and sodium chlorate. The second salts do not form a compound with the first salt and have a solubility that increases less than the solubility of the first salt increases with increasing temperatures within the temperature range at which the evaporation is to be carried out. Hence, second salts contemplated within the scope of this invention include salts that have a solubility which decreases with increasing solution temperatures. Accordingly, second salts include sodium chloride, calcium sulfate and magnesium sulfate. However, the present invention will be described with respect to potassium chloride and sodium chloride as the first and second salts, respectively.

As hereinbefore stated, the first evaporator effect is operated above atmospheric pressure, thus above the atmospheric boiling point temperature of the solution. The degree to which operation can be carried out above atmospheric pressure depends upon several factors which most importantly include (1) whether the solution and/or substituents therein undesirably lose their character and (2) whether the evaporation equipment can withstand the high temperatures reached.

The second evaporator effect can also operate above atmospheric pressure so long as the working temperature difference between evaporators is such that at least one evaporator effect is operated at or near atmospheric pressure and at the boiling point temperature of the solution therein. For example, for a potassium chloride-sodium chloride solution containing a minor amount of salt impurities, e.g., about 6 percent by weight salt impurities, the atmospheric boiling point temperature is about 110° C. Hence it is only practical that a maximum of two evaporator effects operate above atmospheric pressure. It is preferred, however, that only one evaporator effect (the first effect) operate above atmospheric pressure.

The mother liquor overflow, hereinafter called overflow, from the evaporator effect(s) operated above atmospheric pressure, hereinafter called super atmospheric evaporator is fed to an evaporator effect which operates at atmospheric pressure, hereinafter called atmospheric evaporator. This is the evaporator effect from which withdrawn solution is forwarded to the settling zone, e.g., a thickener. So, this evaporator effect is operated within 2° C. of the atmospheric boiling point temperature of the solution therein, preferably at or below (within 2° C.) the atmospheric boiling point temperature to avoid flashing and as a consequence cooling and precipitation of potassium chloride which, unless separated from thickener or solids, can amount to a substantial loss of potassium chloride. It is nonetheless, preferred that the solution in this evaporator is substantially at its invariant composition, i.e., between about 85 and 100 percent saturation with respect to potassium chloride and sodium chloride. It is more preferable that the solution is maintained at as near saturation with respect to potassium chloride as possible.

Preferably, the super atmospheric evaporator and the atmospheric evaporator are fed by the overflow from the evaporator which precedes the atmospheric evaporator, hereinafter called the subatmospheric evaporator. Alternately, a portion of the overflow from any evaporator effect cooler than the subatmospheric evaporator can be used as the feed to the super atmospheric evaporator and the other portion of that overflow can be fed to its succeeding evaporator. When the overflow from either of these evaporator effects is used in this manner, it can be heated by steam from all evaporator effects which are by-passed, including steam from the super atmospheric evaporator. The amount of overflow fed to the super atmospheric evaporator can vary so long as its overflow and other solutions which are fed to the atmospheric evaporator do not inadvertently heat or cool the atmospheric evaporator or inadvertently affect the solution therein, thereby causing the solution to deviate from being substantially at its invariant composition. It is preferred that the smallest amount of solution possible be fed to the super atmospheric evaporator(s), thereby minimizing the size of heaters required to raise the temperature of the solution fed thereto. Typically, a sufficient amount would be enough to maintain the solution level in the super atmospheric evaporator plus enough to carry out potassium chloride dissolved in the overflow solution which should contain less than 1% solid potassium chloride.

Reference is now made to the drawing in which a preferred embodiment of the present invention is shown. A potassium chloride-sodium chloride feed 1 at 57° C., saturated with respect to sodium chloride and 70% saturated with respect to potassium chloride is evaporated in a five effect evaporation system. A portion 2 of the feed 1 is utilized as an elutriant for precipitating sodium chloride in the fifth evaporator effect 31, thereby fluidizing fine salt impurities which are carried over to the fourth evaporator effect 32 along with overflow 3. Similarly, portions 4, 8 and 13 of overflows 3, 7 and 12 are utilized as an elutriant in the fourth, third and second effect evaporators, 32, 33 and 34, respectively. Stream 25 elutriates precipitated sodium chloride in the first evaporator effect 35. Precipitated sodium chloride in the fifth and fourth evaporator effects 31 and 32, is forwarded via streams 5 and 9 to the fourth and third evaporator effects, 32 and 33, respectively. Precipitated sodium chloride in the second and first evaporator effects 34 and 35 is recycled via streams 20 and 16 to the second and third evaporator effects, 34 and 33, respectively. Hence, sodium chloride must be removed from the system at the third evaporator effect 33 via stream 11. This allows all evaporator effects except the third evaporator effect 33 to be operated at 100 percent saturation with respect to potassium chloride without losing precipitated potassium chloride during evaporation.

The overflows 3,7 and 12 from the fifth, fourth and third evaporator effects, 31, 32, and 33, are forwarded to the fourth, third and second evaporator effects, 32, 33 and 34, respectively. A portion 14 of overflow 12 is carried through heat exchangers 36 and 37 wherein it is heated by steam via streams 17 and 22, respectively. The heated overflow stream 24 is fed into the first evaporator effect 35. The first evaporator effect 35 is heated by steam from boiler 39 via stream 26. Steam from the first, second, third and fourth evaporator effects, 35, 34, 33 and 32, heats the second, third, fourth and fifth evaporator effects 34, 33, 32 and 31, via streams 21, 15, 10 and 6, respectively. Steam 41 from the fifth evaporator effect 31 is condensed in condenser 40, a cooling tower, wherefrom water can be forwarded for use elsewhere in the process. Overflow 18 from the second evaporator effect 34 is forwarded to thickener 38 wherein fine salt impurities are separated and from which clarified mother liquor is forwarded to be treated for the production of potassium chloride.

Hence, the second evaporator effect 34 is operated at atmospheric pressure for a potassium chloride-sodium chloride solution at its invariant composition for 110° C. The first evaporator effect 35 is operated above atmospheric pressure, i.e., 1602 mm Hg, for a boiling temperature of 135° C. The remaining evaporator effects, three, four and five are operated below atmospheric pressure, i.e., 480 mm Hg, 289 mm Hg, and 46 mm Hg, respectively, for a boiling temperature of 87° C., 66° C. and 47° C., respectively. A fraction of overflow 12 is forwarded via streams 14, 23 and 24 to the first evaporator effect 35 from which overflow 19 is recycled to the second evaporator effect 34. The fraction is regulated to maintain solid potassium chloride in stream 19 at less than about 0.2 percent. Thus, it can be seen that evaporation of a potassium chloride-sodium chloride solution can be carried out at super atmospheric pressure without flashing and with effluent from the evaporation system withdrawn at atmospheric pressure via stream 18.

While this invention has been described with specific reference to potassium chloride-sodium chloride salt solutions and with reference to otherwise limited embodiments, they should not be regarded as limitations upon the breadth of the invention, except to the extent the limitations are included in the claims.

What is claimed is:

1. In a method of concentrating an aqueous solution containing a first salt and a second salt, the solubility of the first salt increasing more with increasing temperature than the solubility of the second salt, by multiple effect evaporation wherein the multiple effect evaporators comprise at least three evaporator effects, wherein the multiple effect evaporators are backward fed, wherein the first evaporator effect is the hottest, wherein second salt is precipitated during evaporation, wherein the concentrated mother liquor from the multiple effect evaporators is forwarded to a zone operated at atmospheric pressure, and wherein mother liquor effluent from the evaporators is forwarded to a zone wherein the first salt is recovered, the improvement comprising:

A. Operating the first evaporator effect at superatmospheric pressure;
B. Operating at atmospheric pressure an evaporator effect which is preceeded in the direction of mother liquor effluent flow by at least one cooler evaporator effect;
C. Feeding to the first evaporator effect a portion of the overflow from the evaporator effect cooler than the evaporator effect operated at atmospheric pressure, wherein the portion bypasses the evaporator effect operated at atmospheric pressure; and
D. Feeding the mother liquor effluent from the first evaporator effect to the evaporator effect operated at atmospheric pressure.

2. The method of claim 1, wherein the multiple effect evaporators are five effect evaporators, wherein the second evaporator effect is operated at atmospheric pressure, wherein the third evaporator effect has one portion of its overflow fed to the second evaporator effect and the other portion fed to the first evaporator effect.

3. The method of claim 1 or 2, wherein steam from the evaporator effect operated at atmospheric pressure and the first evaporator effect are utilized for heating the feed to the first evaporator effect.

* * * * *